United States Patent [19]
Yamamoto

[11] 3,828,594
[45] Aug. 13, 1974

[54] LOCKING DEVICE FOR A MOTOR VEHICLE STEERING MECHANISM

[75] Inventor: Yukio Yamamoto, Ohmiya, Japan

[73] Assignees: Nissan Motor Company, Limited, Yokohama; Kanto Seiki Company, Limited, Ohmiya Saitama Prefecture, both of Japan

[22] Filed: May 21, 1973

[21] Appl. No.: 362,298

[30] Foreign Application Priority Data
May 31, 1972  Japan.............................. 47-53957

[52] U.S. Cl.................................. 70/252, 70/186
[51] Int. Cl............................................ B60r 25/04
[58] Field of Search ............ 70/239, 241, 243, 248, 70/250, 251, 252, 254, 255, 257, DIG. 30, 186

[56] References Cited
UNITED STATES PATENTS
| 3,673,829 | 7/1972 | Mizuno................................. 70/252 |
| 3,748,877 | 7/1973 | Wolter............................. 70/252 X |

FOREIGN PATENTS OR APPLICATIONS
| 1,081,367 | 8/1967 | Great Britain....................... 70/252 |
| 2,060,073 | 6/1971 | Germany.............................. 70/252 |

Primary Examiner—Robert L. Wolfe
Assistant Examiner—Richard P. Tremblay

[57] ABSTRACT

A key operated mechanism with one locked position and at least one unlocked position, by which it is not possible to return from an unlocked position to a locked position using the key until a mechanical member is actuated, all operations capable of being performed with one hand.

19 Claims, 12 Drawing Figures

PATENTED AUG 13 1974

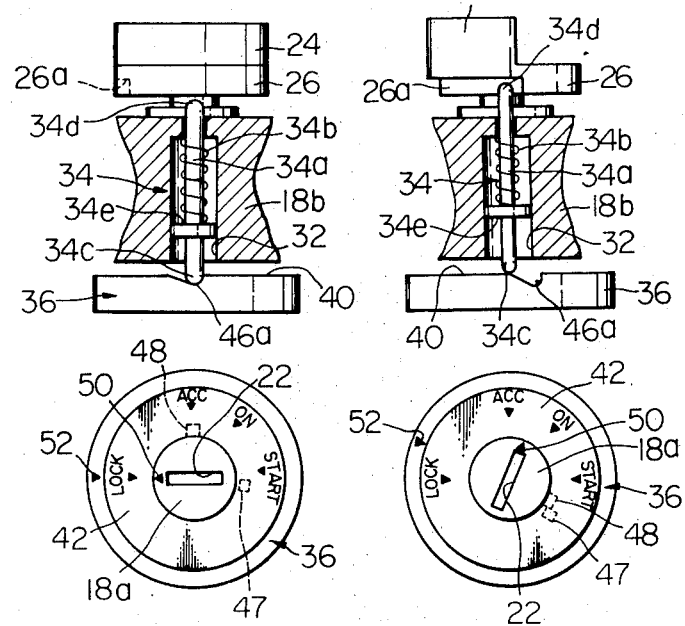

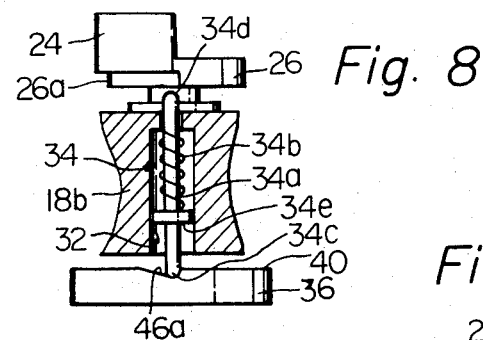
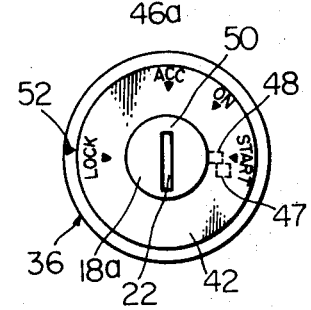
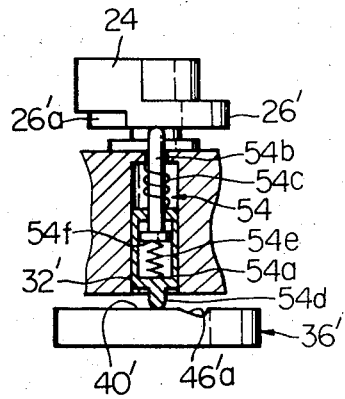
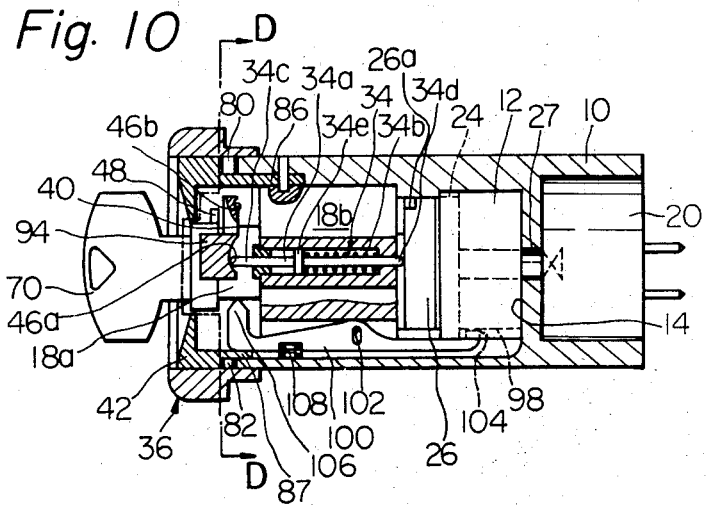

LOCKING DEVICE FOR A MOTOR VEHICLE STEERING MECHANISM

The present invention relates to a locking device which is operable by a key with a safeguard against accidental locking of the device, and more particularly to a locking device for a motor vehicle steering mechanism with a safeguard against accidental locking of the steering system using the key.

In a typical prior art device of this type installed in a steering shaft, the key may not be returned from an unlocked position to a locked position unless a mechanical button in the vicinity of the key hole is depressed and held depressed until the key operation is completed. Since the driver is required to manipulate the key concurrently with depressing the button in locking the steering shaft, the risk of accidental locking of the steering is minimized. However, a rather cumbersome operation is required in locking the steering shaft.

It is an object of the present invention to provide a locking device for a motor vehicle steering mechanism by which the risk of accidental locking of the steering is minimized, but operation thereof in locking the steering mechanism is simple.

It is another object of the present invention to provide a locking device comprising a key operated cylinder type locking mechanism and a safeguard against accidental locking mechanism compactly incorporated therein, which can be utilized to lock a motor vehicle steering system and requires only minimum modification of the steering system.

The present invention will be further described below by way of example with reference being made to the accompanying drawings, in which:

FIG. 3 is a sectional view taken through line C—C of FIG. 1;

FIGS. 4 to 8 are diagrammatic views, partly in section, illustrating operation of the parts shown in FIG. 2;

FIG. 9 is a diagrammatic view, partly in section, illustrating another embodiment of the present invention;

FIG. 10 is a top sectional view showing another embodiment of a locking device of the present invention;

Figure 1:
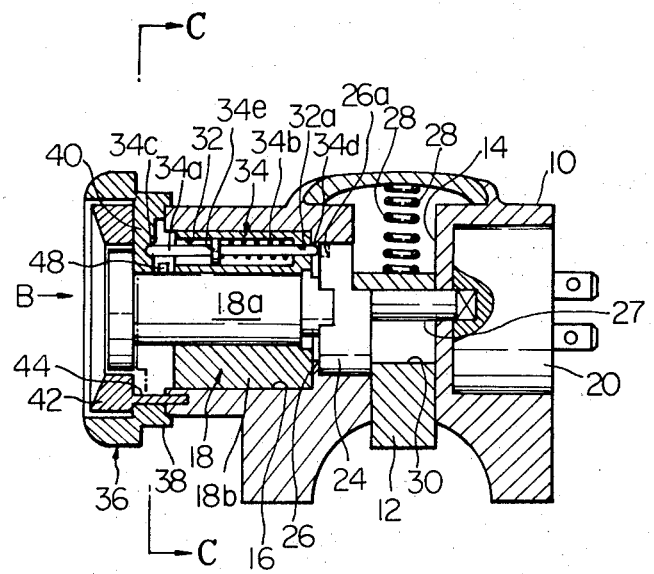
FIG. 1 is a sectional side view showing one embodiment of a locking device of the present invention.
Figure 11:
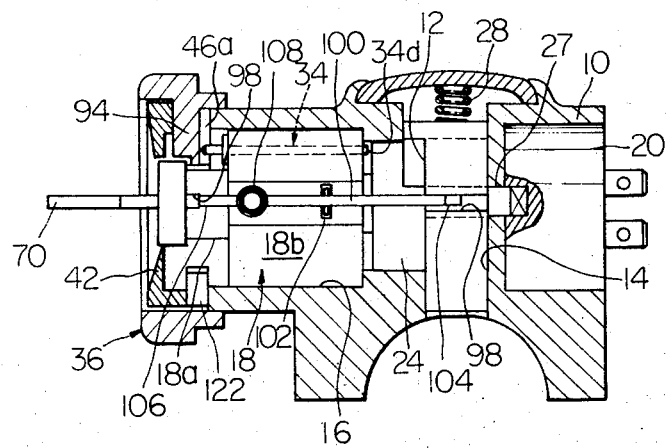
FIG. 11 is a side sectional view of the locking device shown in FIG. 10.

In the following description, the expressions "left" and "right" and derivations thereof refer to locking devices as shown in FIGS. 1, 10 or 11, and the expressions "clockwise" and "anti-clockwise" refer to locking devices as shown in FIGS. 4 to 9 and 12 or to locking devices shown in FIG. 1 or 10 or 11 assuming that they are viewed from their left sides as shown.

Referring now more particularly to the drawings and especially to FIG. 1, a housing 10 carries therein a locking bolt 12, such that when the locking device is suitably mounted on a motor vehicle steering column (not shown), the bolt 12 may extend into the steering column to lock a steering shaft (not shown) extending through the steering column.

The housing 10 of the locking device shown in FIG. 1 has formed therein a main bore 14 extending into the housing 10 perpendicular to its longitudinal axis to permit the locking bolt 12 to slide therein. The housing 10 has also formed therein a longitudinal auxiliary bore 16 extending from the left end of the device and opening at least partially into the main bore 14. The auxiliary bore 16 accommodates therein a lock generally indicated by a reference numeral 18 and an ignition switch 20.

The lock 18, which may of any prior art cylindrical, key operated type, comprises a key operated rotatable lock cylinder 18a and a stationary cylinder housing 18b. The cylinder housing 18b is secured in said auxiliary bore 16. The lock cylinder 18a has a key slot 22, and is rotatable when a proper key 70 (not shown in FIGS. 1 to 9) is inserted into the key slot 22.

Attached to the right end of the lock cylinder 18a is a substantially semi-cylindrical cam 24 integrally formed with a substantially disc 26, the cam 24 and disc 26 being rotatable together with the inner lock cylinder 18a. A spindle 27 extends from the right end of the cam 24 to the ignition switch 20 for operative rotational engagement therewith.

The locking bolt 12 is continuously biased by a spring 28 to assume a locked position as shown in FIG. 1. A portion of the semi-cylindrical cam 24 extends through a window 30 formed in the locking bolt 12 so that by rotating the lock cylinder 18a and thus the cam 24 by means of the key 70, the locking bolt 12 may be thus retracted into the housing 10 to an unlocked position, although not shown in the drawings.

The cylinder housing 18b has also formed therein a stepped cylindrical bore 32 extending longitudinally there through. The stepped cylindrical bore 32 has a reduced diameter section 32a which opens through the right end of the cylinder housing 18b. A blocking mechanism generally indicated by a reference numeral 34 is slidably received in the stepped cylindrical bore 32.

A generally annular movable control member 36 abuts with the left end of the housing 10, and is carried thereon and is rotatable about the axis of the auxiliary bore 16 by means of a sleeve portion 38 integrally formed with the control member 36. Also integrally formed with the control member 36 is an annular segment member 40 (see FIG. 2).

A face plate 42 retains the control member 36 against the left side of the housing 10, as will be readily appreciated by referring to FIG. 1. The face plate 42 is secured to the housing 10 by a segmented annular sleeve 44 formed thereon which tightly fits into the housing 10. As will be understood from FIG. 3, a portion of the segmented annular sleeve 44 is engageable with the annular segment member 40 to prevent the control member 36 from rotating out of a certain range.

The blocking mechanism 34 comprises a plunger 34a axially slidable in the stepped cylindrical bore 32. The plunger 34a is at all times biased toward the annular segment member 40 by means of a compression spring 34b and a spool 34e. The plunger 34a has a left end 34c abutting against the annular segment member 40 and a right end 34d engageable with the disk 26.

Figure 2:
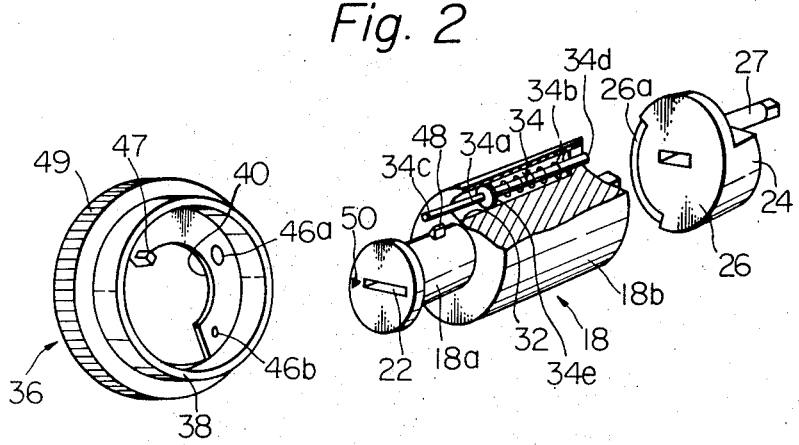
FIG. 2 is an exploded view of various important parts of the locking device shown in FIG. 1.

Formed on a side of the annular segment member 40 which at all times abuts with the left end 34c of the bolt 34a, as is best seen in FIGS. 2 and 3, are a first detent 46a, a second detent 46b, and a lug 47.

Formed in the side of the disk 26 which faces the annular segment member 40 is a generally semi-annular groove 26a which is engageable with the right end 34d of the bolt 34a.

Formed on an outer surface of the lock cylinder 18a is a projection 48 which is operably engageable with the lug 47 of the annular segment member 40.

The control member 36 has formed on its periphery a plurality of protrusions such as knurlings 49 for ease of manipulation of the control member 36. If desired however, a handle (not shown) may be provided at the periphery of the control member 36 instead of the knurlings 49.

Referring now particularly to FIGS. 4 to 8 inclusive, it will be seen that the face plate 42 has formed thereon markings (no numeral) such as "LOCK," "ACC," "ON," and "START," at positions corresponding to respective operating positions of the ignition switch 20, and is fixed to the housing 10. The lock cylinder 18a has formed an index 50 which aligns with the markings on the face plate 42 when the lock cylinder 18a is rotated by the key 70. It will also be seen that the control member 36 has an index 52.

FIGS. 1 and 4 illustrate the locking device in a "LOCK" condition in which the blocking mechanism 34 is disengaged from the disc 26. It is therein seen that the left end 34c of the plunger 34a is positioned in the first detent 46a of the annular segment member 40, and the right end 34d thereof is completely retracted from the disc 26 by the force of the compression spring 34b acting on the spool 34e. The projection 48 and the lug 47 are angularly spaced apart from each other as shown in FIG. 4. As best seen in FIG. 1, the semi-cylindrical cam 24 is positioned so as to allow the locking bolt 12 to assume a locked position. Insertion of the proper key 70 is possible only when the locking device is in the condition shown in FIG. 4. Upon insertion of the key 70 into the key slot 22 of the lock cylinder 18a, the lock cylinder 18a can be rotated clockwise from the "LOCK" position to the "ACC" ("ACCESSORY") position. By clockwise rotation of the key from the "LOCK" position to the "ACC" position, the locking bolt 12 is moved from its locked position to an unlocked position due to rotation of the semi-cylindrical cam 24 therein. Upon reaching the "ACC" position, the projection 48 contacts the lug 47, and a portion of the semi-annular groove 26a comes into alignment with the plunger 34a (see FIG. 5).

When the lock cylinder 18a is rotated clockwise beyond the "ACC" position to the position of FIG. 5, the control member 36 is rotatably displaced from a first position shown in FIG. 4 by means of the projection 48 operatively engaging the lug 47. By this rotation of the inner lock cylinder 18a beyond the "ACC" position, the left end 34c of the plunger 34a is forced out of the first detent 46a and rides on the surface of the annular segment member 40 against the force of the compression spring 34b, and the right end 34d of the plunger 34a projects into the semi-annular groove 26a of the disc 26. It is then possible for the left end 34c of the plunger 34a to slidably abut against the surface of the annular segment member 40, and the end 34d to extend into the semi-annular groove 26a as the cylinder 18a is rotated clockwise from the position of FIG. 5 to the "START" position (i.e., the position of FIG. 6).

Figure 6:
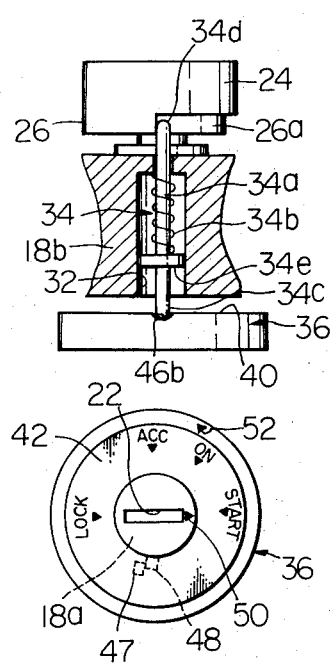

When the lock cylinder 18a is rotated clockwise from the position of FIG. 5 to the position of FIG. 6, the left end 34c of the bolt 34a will drop into the second detent 46b. It will be noted here that a portion of the other end 34d is positioned within the semi-annular groove 26a even though the plunger 34a has dropped into the second detent 46b. It can also be seen that in the condition of the locking device shown in FIG. 6, the right end 34d is adjacent to an end of the semi-annular groove 26a, and further clockwise rotation of the lock cylinder 18a from the position of FIG. 6 is thus prevented. It will be appreciated that by clockwise rotation of the lock cylinder 18a from the position of FIG. 4 to the position of FIG. 6, the control member 36 is automatically rotated from its first position to a second position (i.e., the position of FIG. 6).

If, now, the inner lock cylinder 18a is rotated anti-clockwise from the position of FIG. 6, the control member 36 will be held in the position of FIG. 6 because the left end 34c is held in the second detent 46b by the force of the compression spring 34b and because the projection 48 disengages from the lug 47.

Figure 7:
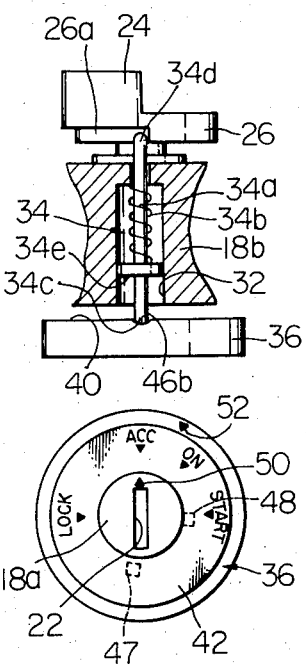

When the lock cylinder 18a is returned from the position of FIG. 6 to the position of FIG. 7, the right end 34d of the plunger 34a will be adjacent to the other end of the semi-annular groove 26a, preventing the lock cylinder 18a from rotating further anticlockwise from the position of FIG. 7 to the "LOCK" position (it will of course be understood that prior to returning to the position of FIG. 7 from the position of FIG. 6, the locking device may be maintained in the intermediate "ON" position as long as desired). Therefore, once the lock cylinder 18a has been rotated through the "ACC" position to the "START" position, anti-clockwise rotation of the lock cylinder 18a from the "ACC" position to the "LOCK" position is prevented.

To lock the steering shaft, the lock cylinder 18a is rotated to the position of FIG. 7, and the control member 36 is then manually rotated anti-clockwise from the position of FIG. 7 to the position of FIG. 8. When the control member 36 is moved back to its first position, the left end 34c drops again into the first detent 46a and the right end 34d recedes from the semi-annular groove 26a, permitting anti-clockwise rotation of the lock cylinder 18a to the "LOCK" position from the position of FIG. 8. The lock cylinder 18a thus rotating to the "LOCK" position allows the semi-cylindrical cam 24 to rotate to a position such as to release the locking bolt 12 to lock the steering column.

The plunger 34a shown in FIGS. 1 to 8 is one single piece. If desired, however, this plunger may be constructed in two pieces.

FIG. 9 illustrates an example of a blocking mechanism 54 employing such a two-piece-plunger. The plunger, as shown, comprises an outer sleeve 54a and an inner rod 54b. The outer sleeve 54a is slidable in a large diameter section of a stepped cylindrical bore 32', and is biased toward a control member 36' by a compression spring 54c and a spool 54f. Formed on an end of the outer sleeve 54a adjacent to the control member 36' is a projection 54d which abuts against an annular segment member 40' which is integrally formed with the control member 36'. The inner rod 54b is telescopically received into the outer sleeve 54a against the force of another compression spring 54e and the spool 54f. The blocking mechanism 54 thus described with provide reduction in the precision required in manufacture because a certain amount of mis-alignment between the first detent 46′a and the semi-annular groove 26′a is allowable when the locking device is in the position of FIG. 8.

From the foregoing description it can be seen that the blocking mechanism 34 or 54 serves to provide resistance against the control member 36 or 36′ moving out of its first and second positions.

As can be seen in FIGS. 4 and 5 inclusive, one end of the first detent 46a has a sharp incline while the other end has a more gradual incline. It will be appreciated that clockwise rotation of the control member 36 from the position of FIG. 4 to the position of FIG. 5 is slightly resisted but allowed because the left end 34c of the spring loaded plunger 34a is able to ascend the gradual incline, but anti-clockwise rotation of the control member 36 from the position of FIG. 4 is prevented because the left end 34c of the plunger 34a is not able to ascend the sharp incline.

FIG. 3 illustrates the position of the annular segment member 40 relative to the segmented annular sleeve 44 when the locking device is in its locked or "LOCK" position. As can be readily seen from FIG. 3, further anti-clockwise rotation of the control member 36 beyond the position of FIG. 4 and further clockwise rotation of the control member 36 beyond the position of FIG. 6 or 7 is prevented because rotation of the annular segment member 40 is blocked by the segmented annular sleeve 44.

Figure 12:
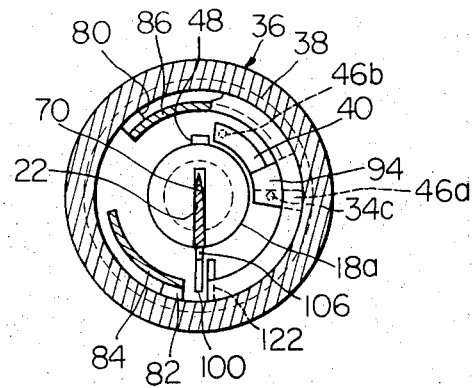
FIG. 12 is a sectional view taken through line D—D of FIG. 10.

Referring now to FIGS. 10 to 12, there is shown another embodiment of a locking device of the present invention. With the exception of features which will be described below in detail, the configuration and operation of the device is substantially identical with that of the device shown in FIGS. 1 to 8, and like reference numerals denote like components and parts in both cases.

The embodiment of the device shown in FIGS. 10 to 12 includes an additional safeguard against accidental locking of the device using the key. In the device of FIGS. 10 to 12, the locking bolt 12 is allowed to return to a locked position from an unlocked position if the control member 36 is rotated from its second position to its first position, and the inner lock cylinder 18a is rotated from its "ACC" position to its "LOCK" position by means of the key 70. The device of FIGS. 10 to 12 further prevents the locking bolt 12 from assuming a locked position from an unlocked position following the above mentioned operations until the key 70 is withdrawn from the key slot 22.

Referring now to FIG. 10, an embodiment of a locking device of the present invention comprises a lever 100 pivotably carried on a pin 102 by means of a hole or slot (no numeral) formed therein, and a compression spring 108 which biases the lever 100 toward the inner lock cylinder 18a as shown. The lever 100 has formed on an end adjacent to the ignition switch 20 a latching tab 104 which is operably engageable with a longitudinal groove 98 formed in the locking bolt 12 such that when the latching tab 104 extends into the groove 98, the bolt 12 is prevented from returning to a locked position from an unlocked position.

The inner lock cylinder 18a has formed therein a key groove 66 communicating with the key slot 22 (see FIG. 11) at a position adjacent to a back face (i.e., the face opposite a serrated operating face) of the key 70 when the key 70 is inserted into the key slot 22. A follower 106 is formed on the other end of the lever 100 and is operably engageable with the back face of the key 70 through the key groove 66. Thus, when the key 70 is inserted into the key slot 22, the follower 106 of the lever 100 is forced away from the inner lock cylinder 18a and accordingly the latching tab 104 is urged toward the locking bolt 12 due to the action of the lever 100 pivoting about the pin 102. It will be understood that when the key 70 is first inserted into the locking device, the locking bolt 12 is in a locked position and the groove 98 is not in alignment with the latching tab 104. Since in this case a danger is created of breaking the lever 100 or pin 102 due to a force being applied to the follower 106 by the key 70 and a resistance being encountered due to the latching tab 104 contacting a hard surface of the locking bolt 12 rather than being allowed to enter the groove 98, various means may be incorporated to avoid this problem, examples of which are described below.

The lever 100 may be formed of a resilient material and be pivotably carried on the pin 102 by means of a substantially circular hole formed therein, thus allowing the lever 100 to elastically deform and accommodate the forces applied thereto, or the lever may be formed of a relatively hard material and be pivotably carried on the pin 102 by means of a slot formed therein, the slot being oriented perpendicular to the longitudinal axis of the lever 100 and being of a sufficient length to prevent the lever 100 or pin 102 from being broken in response to the applied forces described above, or a combination of the described methods.

The inner lock cylinder 18a and the key groove 66 are so arranged (see FIG. 10), that the back face of the key 70 when inserted into the locking device is substantially with the periphery of the inner lock cylinder 18a at the point where it engages with the follower 106, and that if the inner lock cylinder 18a is rotated by means of the key 70 from a locked position to an unlocked position, the follower 106 will slidably abut with the periphery of the inner lock cylinder 18a and be held in the same relative position throughout operation of the locking device until the key 70 is removed from the device. As the inner lock cylinder 18a is rotated from its locked position to an unlocked position such as the "ACC" position, the locking bolt 12 will be retracted into the housing 10 by the semi-cylindrical cam 24 such that the groove 98 will come into alignment with the latching tab 104. At this point, the latching tab 104 will drop into the groove 98, and as will be understood from the foregoing descriptions, will remain therein thus holding the locking bolt 12 in a locked position throughout operation of the locking device until the key 70 is removed from the device.

Also, this embodiment of the invention differs from the previously described embodiment in that the lug 47 of the previous embodiment is replaced herein by a shoulder 94 which is operatively engageable with the projection 48 as described in reference to the previous embodiment. In this case the rotational range of the shoulder 94 and thus the control member 36 is limited by a portion 86 of the segmented annular sleeve 44 of the face plate 42 at one extreme, and by a stopper 122 at the other extreme, as is clearly shown in FIG. 12. Also in this embodiment, another portion 84 of the segmented annular sleeve 44 is provided such that the portions 86 and 84 of the segmented annular sleeve 44 of the face plate 42 are in operative rotational engagement with lugs 80 and 82 respectively of the annular segment member 40 of the control member 36 to guide the control member 36 in rotation about the longitudinal axis of the auxiliary bore 16. It will be noted here that the operating positions of the ignition switch 20 may be modified in this embodiment of the invention to correspond with the rotational range of the inner lock cylinder 18a.

Another operating feature of both described embodiments of the invention is that the lock cylinder 18a may be moved from its "ON" position to its "ACC" position by rotating the control member 36 from its second position to its first position.

It will be understood that the above embodiments of a locking device according to the present invention are by means of example only, and that considerable modification may be made by persons skilled in the art without departing from the scope of the invention. Especially, it will be understood that the ignition switch 20 may comprise a mechanism of detents for holding the locking device in positions such as "LOCK," "ACC," "ON" and "START" as described above, and/or means springably returning the locking device from a "START" position to an "ON" position when the key is released at the "START" position by the operator. Alternatively, these features may be incorporated into the locking device by other means, although not shown or described herein.

What is claimed is:

1. A locking device for a vehicle steering mechanism, comprising:
   a key operated movable member;
   means for automatically blocking said key operated movable member against return movement from a predetermined position once said key operated movable member has moved beyond said predetermined position, while permitting its movement beyond said predetermined position and its subsequent return movement to said predetermined position;
   a movable control member for disconnecting said key operated movable member from said automatically blocking means when said movable control member is in a first position; and
   means for automatically moving said movable control member from said first position to a second position thereof in response to movement of said key operated movable member beyond said predetermined position, said control member being capable of being moved back to said first position thereof once said key operated movable member has been moved back to said predetermined position.

2. A locking device for a vehicle steering mechanism, comprising:
   a key operated movable member;
   a movable control member movable between a first position and a second position;
   a blocking mechanism to slightly resist said movable control member against moving out of said first position thereof and said second position thereof;
   means cooperable with said blocking mechanism once said key operated movable member has moved beyond a predetermined position to block said key operated movable member against return movement from said predetermined position, while permitting its movement further beyond said predetermined position and its subsequent return movement to said predetermined position;
   said blocking mechanism being operable by said movable control member to release said means for return movement of said key operated movable member from said predetermined position when said control member is in said first position thereof; and
   means for automatically moving said movable control member from said first position thereof to said second position thereof in response to the movement of said key operated movable member beyond said predetermined position, while permitting said movable control member to be moved back to said first position thereof once said key operated movable member has moved back to said predetermined position.

3. A locking device as claimed in claim 2, further comprising:
   a locking bolt;
   means whereby continuous movement of said key operated member first moves said locking bolt to a release position and then retains said locking bolt in said release position.

4. A locking device as claimed in claim 3, further comprising:
   an ignition switch;
   means for operating said ignition switch once said key operated movable member has moved to and beyond said predetermined position.

5. A locking device for a vehicle steering mechanism comprising:
   a housing having a main bore and an auxiliary bore perpendicular to said main bore;
   a locking bolt slidable in said main bore and biased towards a locking position;
   an cylinder housing secured in said auxiliary bore;
   an lock cylinder disposed in said cylinder housing, said lock cylinder having a longitudinal slot and being rotatable when a proper key is inserted into said longitudinal slot;
   a cam secured to said lock cylinder and engageable with said locking bolt so that continuous rotation of said lock cylinder first moves said locking bolt to an unlocked position and then retains said locking bolt in said unlocked position;
   a blocking mechanism;
   means cooperable with said blocking mechanism once said lock cylinder has moved beyond a predetermined position to lock said lock cylinder against return movement from said predetermined position, while permitting its movement beyond said predetermined position and subsequent return movement to said predetermined position;
   a control member carried by said housing and rotatable between a first position and a second position;

said blocking mechanism being operable by said control member to release said means for the return movement of said lock cylinder from said predetermined position when said control member is in said first position; and
   means for automatically moving said control member from said first position thereof to said second position thereof in response to the movement of said lock cylinder beyond said predetermined position, while permitting said control member to be moved back to said first position thereof once said lock cylinder has moved back to said predetermined position.

6. A locking device as claimed in claim 5, wherein said cooperable means comprises a disc secured to said lock cylinder and having formed therein a groove cooperable with said blocking mechanism.

7. A locking device as claimed in claim 6, wherein said control member is provided with a portion cooperating at all times with said blocking mechanism.

8. A locking device as claimed in claim 7, wherein said blocking mechanism comprises a plunger at all times biased towards the portion of said control member, said plunger having one end abutting against said portion and another end engageable in said groove.

9. A locking device as claimed in claim 8, wherein said control member is rotatable about the axis of said auxiliary bore.

10. A locking device as claimed in claim 9, wherein said disc and said lock cylinder are rotatable about the axis of said auxiliary bore.

11. A locking device as claimed in claim 10, wherein said portion and said disc are in face-to-face relationship 12. A locking device as claimed in claim 11, wherein said other end of said plunger is engageable with said groove as said lock cylinder is moved once said inner lock cylinder has been moved beyond said predetermined position.

13. A locking device as claimed in claim 12, wherein said groove is moved into alignment with said other end of said plunger when said lock cylinder has been moved beyond said predetermined position.

14. A locking device as claimed in claim 13, wherein said portion has formed therein a first detent which receives therein said one end of said plunger when said control member is in said first position thereof, whereupon said other end of said plunger is disengaged from said disc.

15. A locking device as claimed in claim 14, wherein said portion is provided also with a second detent which receives therein said one end of said plunger when said control member is in said second position thereof, whereupon said other end of said plunger is engaged in said groove.

16. A locking device as claimed in claim 7, wherein said blocking mechanism comprises a two-piece-plunger.

17. A locking device as claimed in claim 16, wherein said two-piece-plunger comprises an outer sleeve biased towards said portion and an inner rod telescopically receivable in said outer sleeve and engageable in said groove.

18. A locking device as claimed in claim 5, further comprising:
 a lever disposed in said auxiliary bore and pivotally mounted in said housing, said lever having a portion engageable with a groove of said locking bolt if and when said locking bolt is in an unlocked position thereof and a further portion engageable with said longitudinal slot of said inner lock cylinder when said key is completely withdrawn from said longitudinal groove; and
 means whereby insertion of said key into said longitudinal groove of said inner lock cylinder causes said further portion to disengage from said longitudinal slot of said inner lock cylinder, rotation of said inner lock cylinder by means of said key toward said predetermined position causes said portion of said lever to drop into said groove of said locking plunger if and when said locking bolt has been moved into an unlocking position thereof and withdrawal of said key from said longitudinal slot of said inner lock cylinder when said portion of said lever has been engaged with said groove of said locking bolt to retract from said groove of said locking bolt to release said locking bolt to a locked position thereof.

19. A locking device as claimed in claim 5, wherein said control member includes a manually operable ring.

* * * * *